Figure 1:
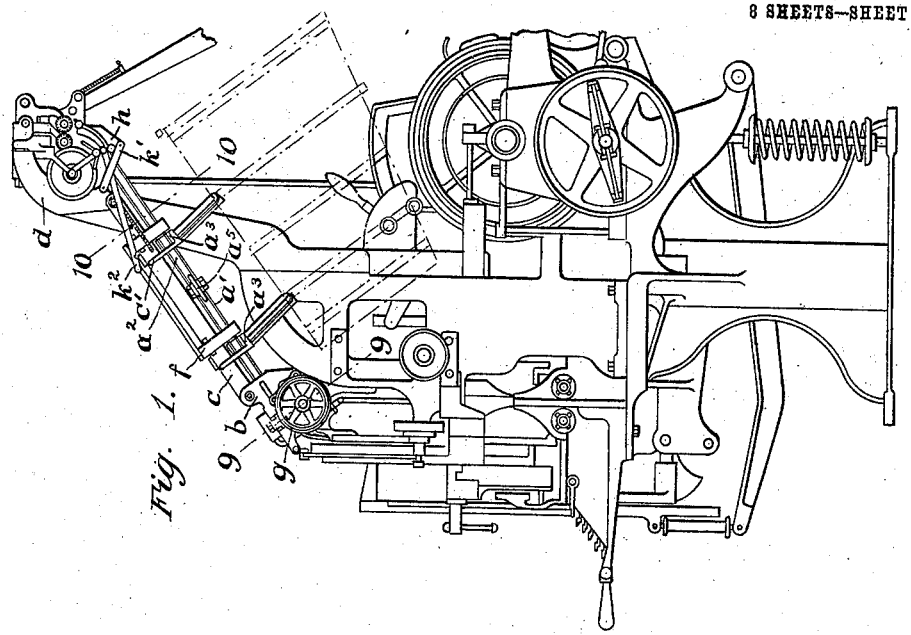

W. H. SCHARF.
LINOTYPE MACHINE.
APPLICATION FILED JAN. 23, 1907.

963,076.

Patented July 5, 1910.
8 SHEETS—SHEET 1.

Witnesses:
Edward E. Pauck
John W. Thompson

Inventor:
William Hermann Scharf
by Liddle Wendell & Varney
Attys.

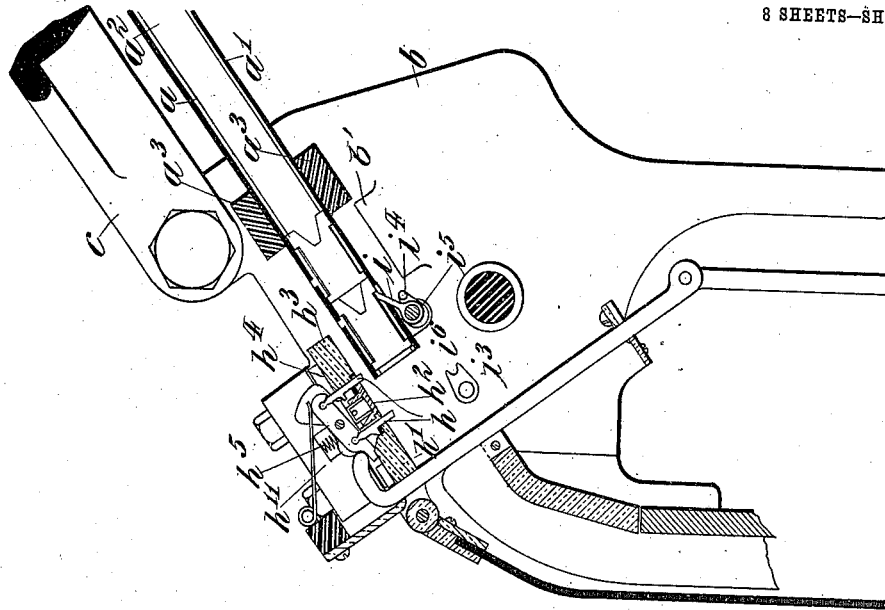
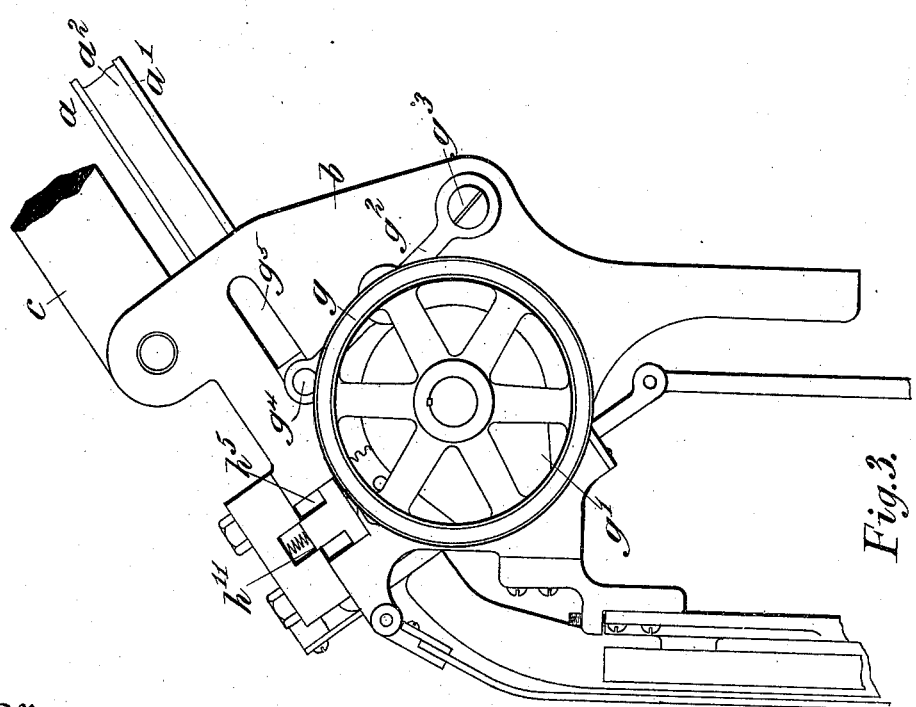

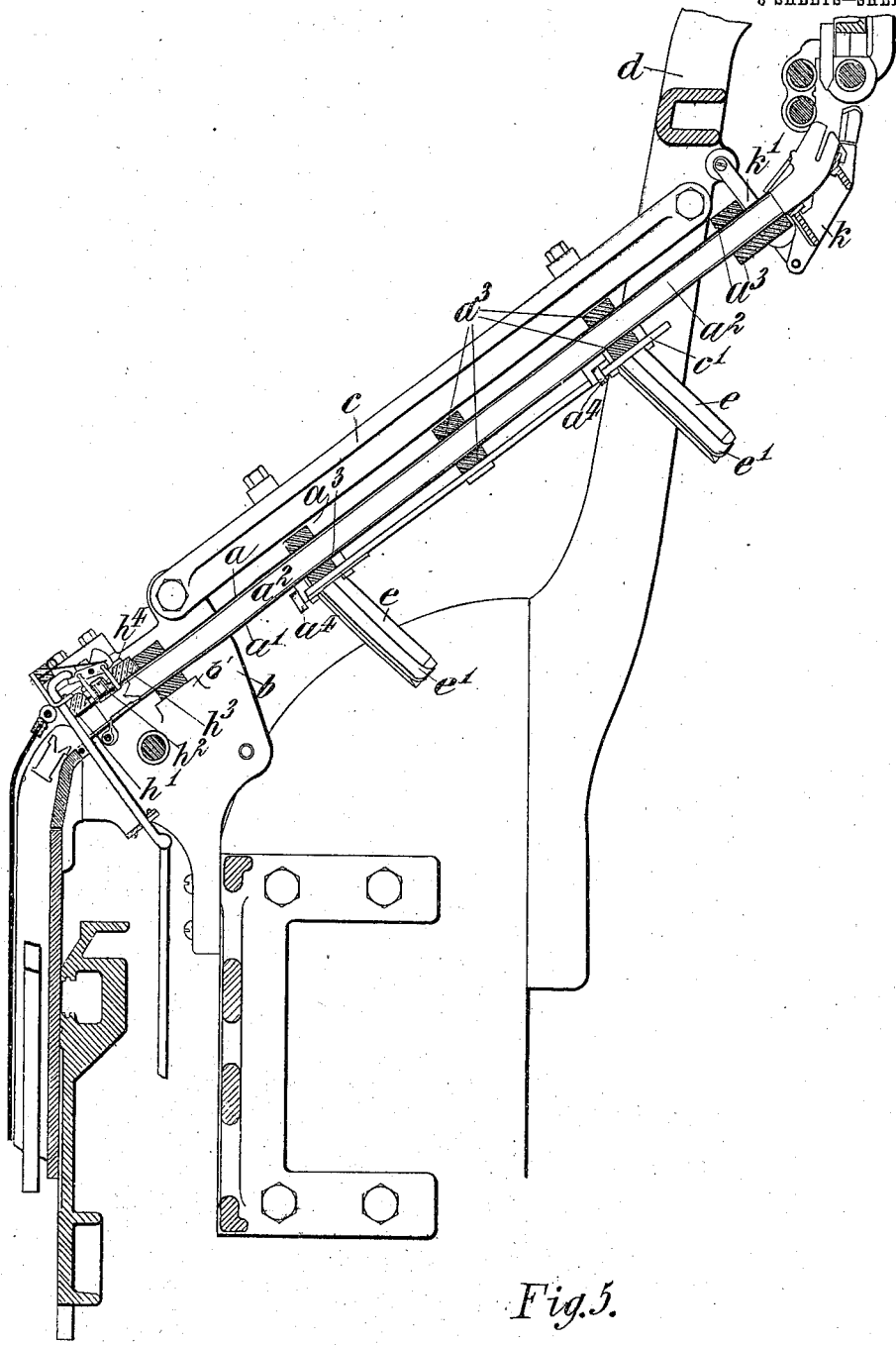

W. H. SCHARF.
LINOTYPE MACHINE.
APPLICATION FILED JAN. 23, 1907.

963,076.

Patented July 5, 1910.
8 SHEETS—SHEET 4.

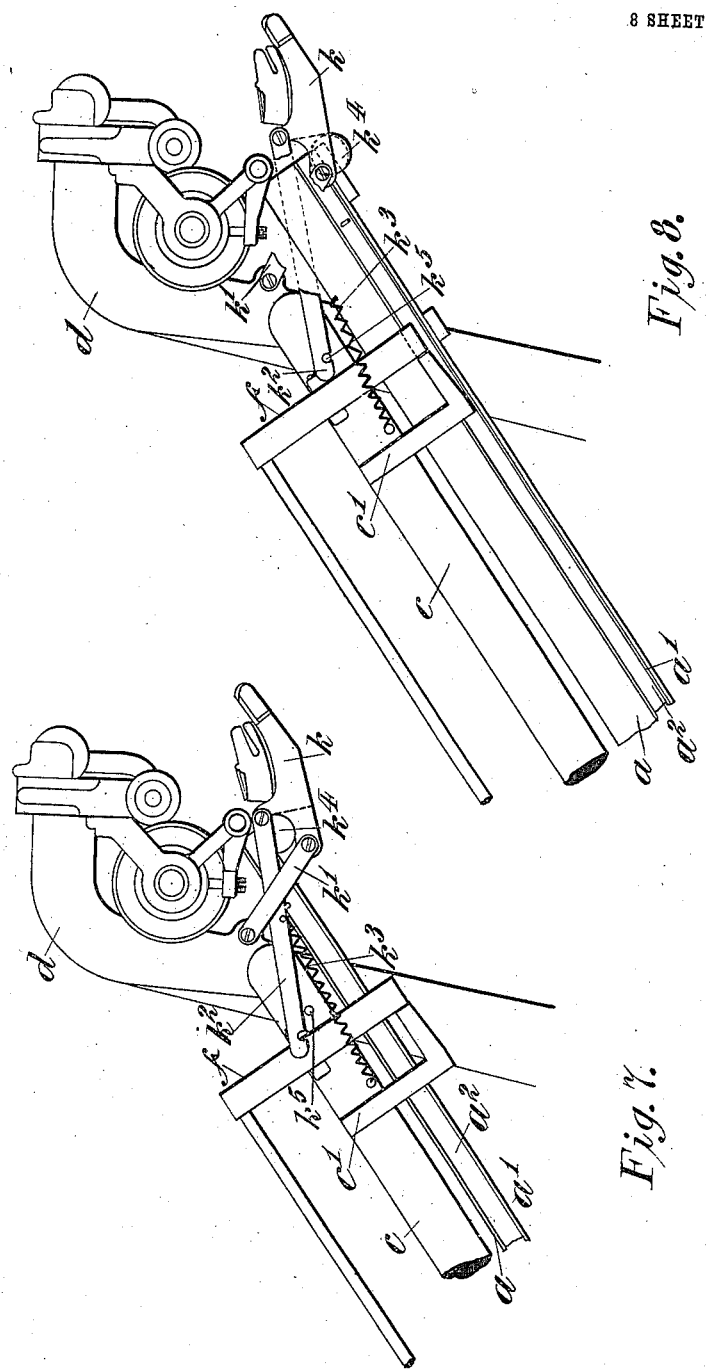

W. H. SCHARF.
LINOTYPE MACHINE.
APPLICATION FILED JAN. 23, 1907.

963,076.

Patented July 5, 1910.
8 SHEETS—SHEET 6.

UNITED STATES PATENT OFFICE.

WILLIAM HERMANN SCHARF, OF MONTREAL, QUEBEC, CANADA, ASSIGNOR, BY MESNE ASSIGNMENTS, TO MERGENTHALER LINOTYPE COMPANY, OF NEW YORK, N. Y., A CORPORATION OF NEW YORK.

LINOTYPE-MACHINE.

963,076.  Specification of Letters Patent.  Patented July 5, 1910.

Application filed January 23, 1907. Serial No. 353,576.

*To all whom it may concern:*

Be it known that I, WILLIAM HERMANN SCHARF, a subject of the King of Great Britain, and a resident of the city of Montreal, in the Dominion of Canada, have invented certain new and useful Improvements in Linotype-Machines, of which the following is a specification, reference being had to the accompanying drawings, forming a part hereof.

The invention relates particularly to the magazines of linotype machines and the like, and to the parts of such machines which are adjacent to the magazine or are associated therewith. Its general object is to provide what may be referred to as a " quick-change mechanism ", that is, one in which the time and labor required to substitute one magazine for another are reduced to a minimum, whereby a change of fonts may be had with comparative ease and despatch.

The magazine, it will be understood, containing as it does a large number of matrices, is extremely heavy, and at best not easily removed, so that the operation of changing fonts, which is often required during the use of a machine, is attended with no little difficulty. The present means are contemplated to reduce this difficulty, first, by stripping the magazine of all unnecessary weight, such as various parts which were heretofore attached to it, and the heavy and cumbersome frame-work usually employed to strengthen and support it while in position on the machine; second, by providing a new and convenient means for supporting, removing and replacing the magazine, and third, by insuring the automatic operation of several of the adjacent parts, thereby saving to the attendant the time and thought which he generally had to give to these parts when taking a magazine off or putting one on.

In accordance with the present invention, the magazine is freed of all of the adjacent parts, and carries no weight besides the contained matrices other than the few bars or strips secured transversely to the same, and through which the magazine is strengthened and supported. Moreover, the improved means provided for removing the magazine, and for replacing it with another magazine have been devised both with a view toward reducing the number of operations required, and toward facilitating the handling of the magazine as it is put on or taken off. Toward these ends, the mechanism for locking the matrices in the magazine to be removed is so related to the mechanism for removing the magazine, that, as the magazine is being removed, the matrices are automatically locked therein; similarly the escapements are separated from the magazine automatically as the operator commences to remove it. Furthermore, the channeled entrance from the distributer mechanism is automatically moved out of the way and latched in its extended position, as the magazine is being removed. Likewise when a magazine is being put upon the machine, these same parts are again operated automatically in the reverse order and automatically assume their normal positions.

The improvements will be more fully described hereinafter with reference to the accompanying drawings, in which they have been conveniently and practically embodied.

Figure 2:
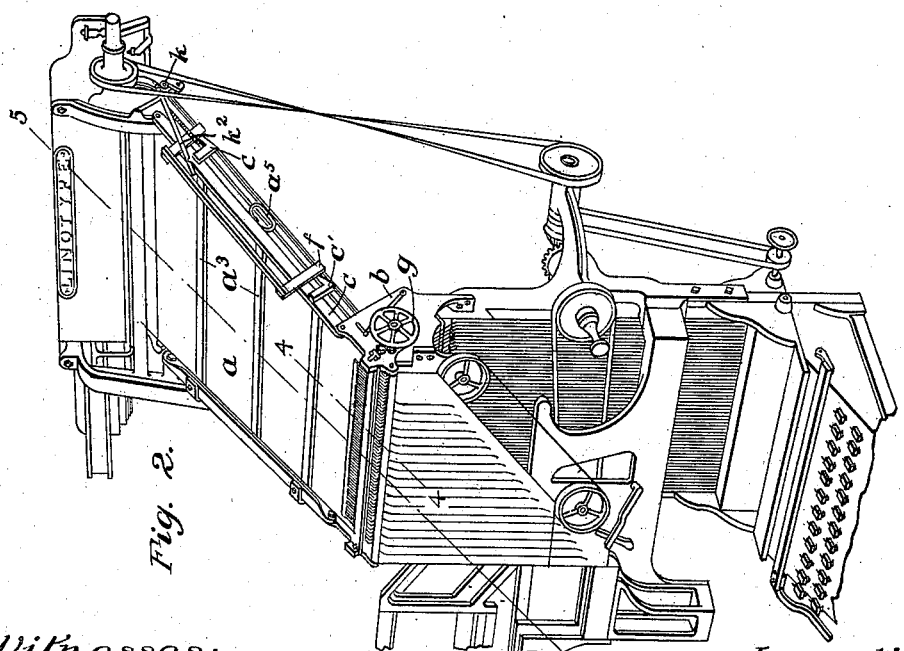
Figure 6:
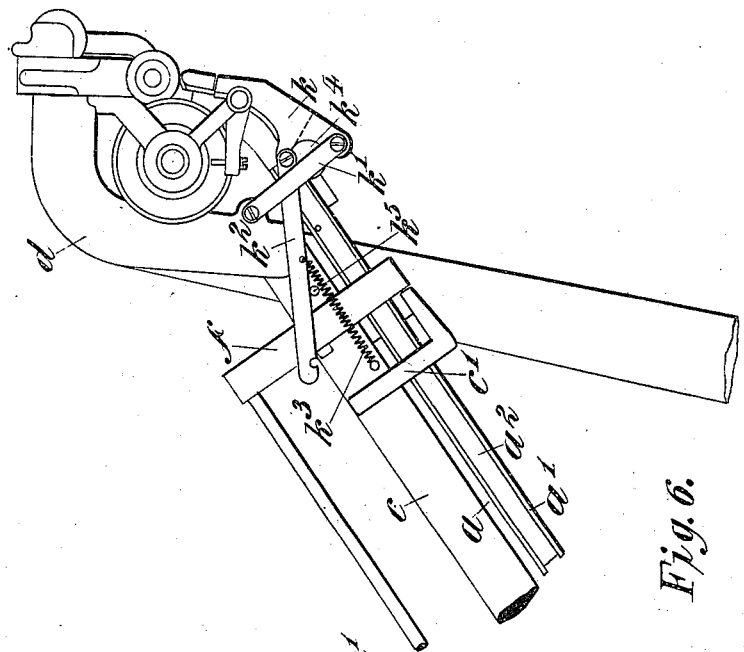
Figure 9:
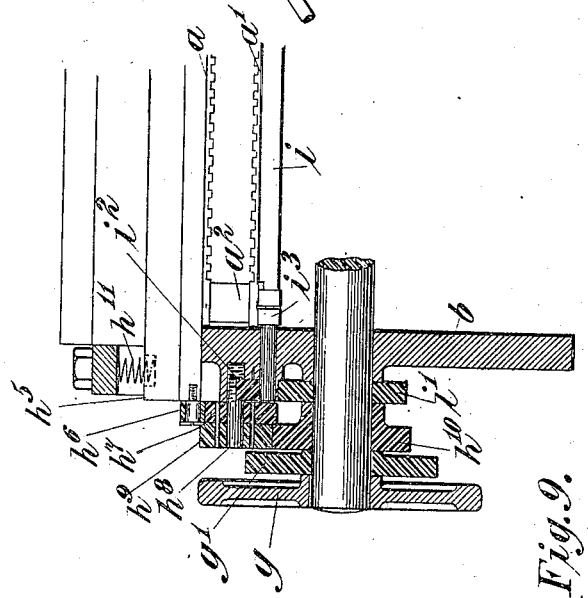
Figure 10:
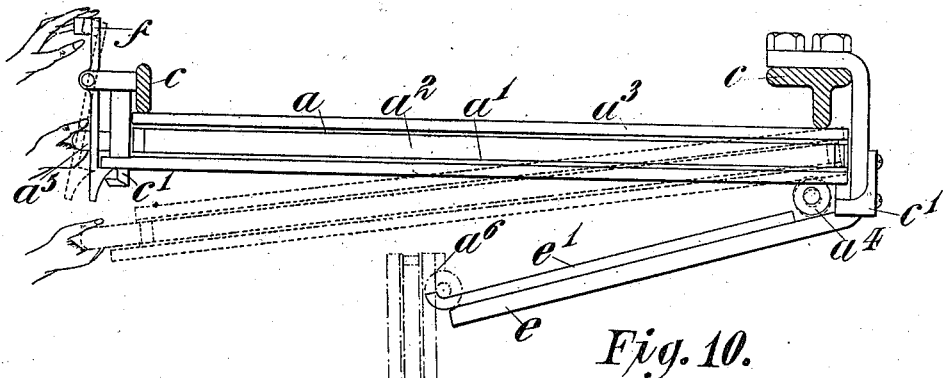
Figure 13:
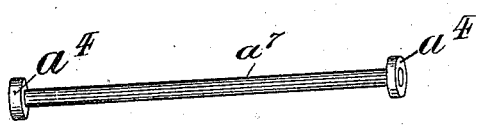
Figure 11:
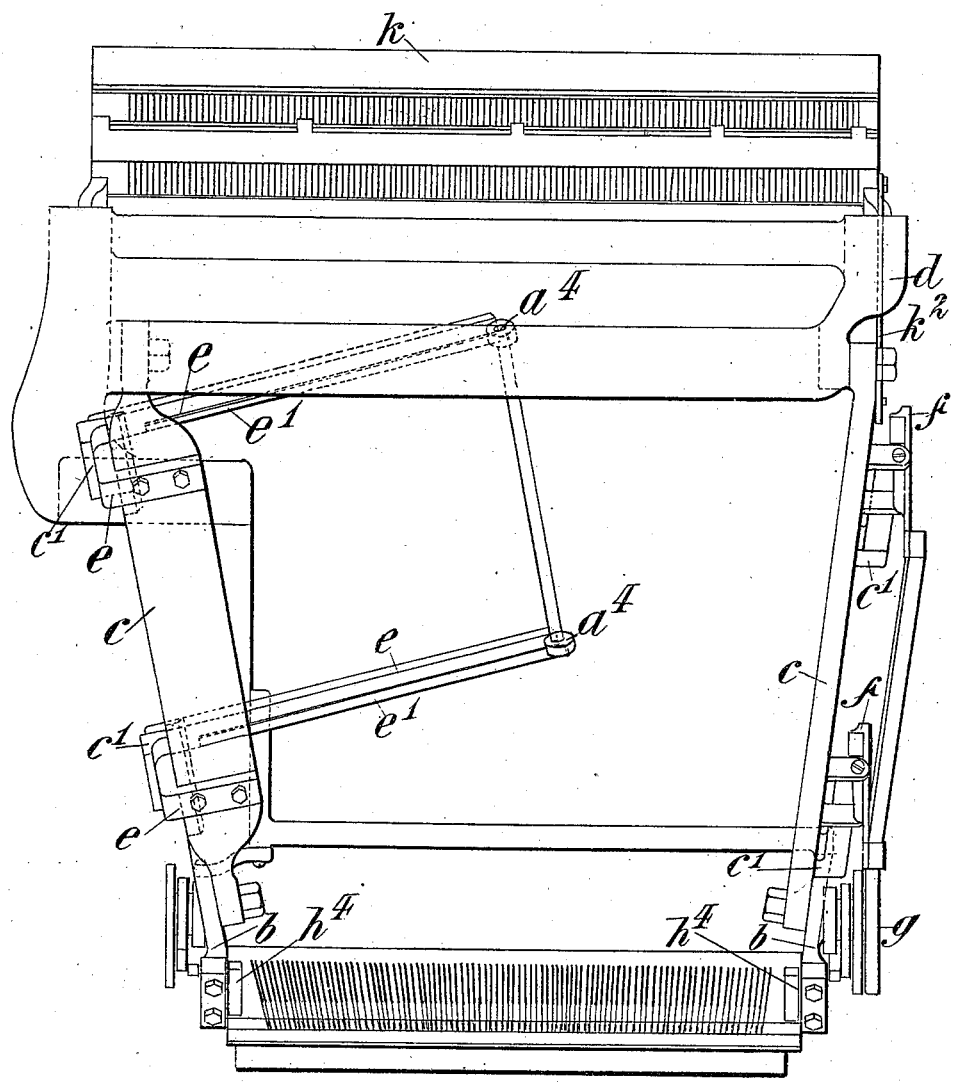
Figure 12:
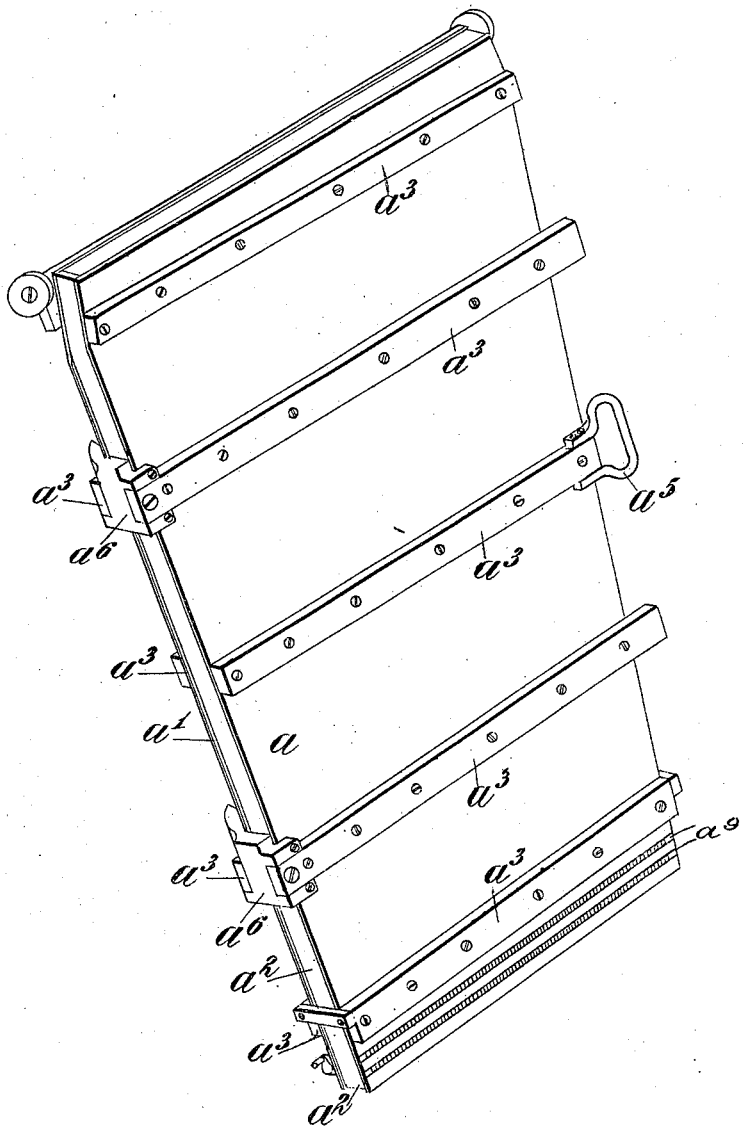

In said drawings Figure 1 is a view in side elevation of a linotype machine containing the improvements, being broken away at the right and most of the machine being shown simply in outline. Fig. 2 is a perspective view of the portion of the machine containing the improvements, looked at from the front. Fig. 3 is a detail view in side elevation, showing the hand wheel and some of its operative connections through which the parts are actuated. Figs. 4 and 5 are detail sectional views, the plane of the sections being indicated by the lines 4—4 and 5—5 respectively of Fig. 2. Figs. 6, 7 and 8 are detail views showing successive positions of the channeled entrance as the magazine is removed from the machine. Fig. 9 is a detail sectional view, the plane of the section being indicated by the line 9—9 of Fig. 1. Fig. 10 is a similar view, the plane of the section being indicated by the line 10—10 of Fig. 1. Fig. 11 is a plan view, showing the top of the machine with the magazine removed, Fig. 12 is a perspective view of the magazine removed from the machine, and, Fig. 13 is a perspective view of the roller carriage for the magazine.

Referring first to the magazine, it will be seen from the drawings that the top thereof consists of a plate $a$ which is integral or solid from end to end, and the inner side of which is channeled as usual for the reception of the matrices. This piece together with the bottom plate $a'$ and the side plates $a^2$ constitute the magazine which is reinforced by transversely arranged strips or bars $a^3$ upon the outside of the magazine secured across the top and bottom plates; there being in the present case five of these strips across the top and five across the bottom. The top, bottom and side plates and the strips $a^3$, through which as will be seen presently, the magazine is supported, form the magazine member, there being no heavy parts or cumbersome frame attached thereto and consequently no added weight from such sources.

The magazine is supported by being suspended from an overlying frame and it is removed from the machine by unfastening it at one side from the overlying frame and permitting this side to swing downwardly while the other side travels down upon inclined guideways directly underneath the magazine. The overlying frame is constituted by a couple of longitudinal bars $c$, one on each side of the machine, secured at one end to forward side brackets $b$ and at the other end to the distributer support $d$; and the magazine is supported underneath this frame through the strips $a^3$, two or more of which project beyond the sides of the magazine and rest, when the magazine is in position upon the machine, in hook-like members $c'$ (Figs. 1, 2 and 6). These hook-like members are secured to and project downwardly from the longitudinal bars $c$, there being in the present case two such hook-like members for each longitudinal bar. On the right-hand side of the machine, as seen from Fig. 2, these hook-like members $c'$ are secured directly to the corresponding longitudinal bar but on the other side of the machine the two hook-like members are attached to forgings $e$ (Figs. 10 and 11) which depend from the other longitudinal bar and, as will be explained hereinafter, constitute guideways upon which the magazine is removed. When the magazine is in position upon the machine with the projecting ends of the strips $a^3$ resting in the hooks $c'$ at each side of the machine, the forward end of the magazine rests down upon a couple of ledges $b'$ (Figs. 4 and 5) in order to keep this end of the magazine steady.

In Fig. 10 the manner of detaching and removing the magazine from the machine is shown. It will be obvious from Figs. 1, 2 and 6 that before the magazine can be swung downwardly it will first have to be disengaged from the hooks $c'$. This is effected by sliding the magazine upwardly in its own plane, the result of which, as is obvious, will be to move the projecting ends of the transverse strips $a^3$ from off the hooks $c'$. Upon the right-hand side of the machine, as seen from Fig. 2, a couple of latches $f$ are provided adjacent to the hooks $c'$ so that when the magazine has been thus slid upwardly and the ends of the strips $a^3$ upon the right-hand side of the machine have been removed from off the hooks $c$, they will rest upon and be supported by the latches $f$ (Fig. 10). Upon the other side of the machine and attached to the magazine are a couple of rollers $a^4$ connected by a rod $a^7$ upon which they are journaled and, when the magazine is slid upwardly as just described, these rollers are brought into register with inclined guideways $e$ which are secured to one of the side bars $c$ and extend down underneath the normal position of the magazine. With the magazine in this position, that is, with the projecting strips $a^3$ upon one side of the machine resting upon the latches $f$ and with the rollers $a^4$ upon the other side of the machine registering respectively with the two inclined guideways $e$, the operator seizes the handle $a^5$, which is upon the same side of the magazine as the latches $f$, and after withdrawing these latches from underneath the projecting ends $a^3$, lowers the side of the magazine adjacent to him.

From Fig. 10 it will be seen that until the operator begins to lower the side of the magazine next to him, the anti-friction rollers $a^4$, while registering with the two guideways $e$, are directly above but do not touch these guideways; they are brought down upon the guideways however as the operator lowers the side of the magazine next to him. In this way, as the magazine is slid upwardly to release it from the hooks $c'$, the rollers do not bind as they are moved over the guideways. The rollers are provided to act simply as an anti-friction device during the removal of the magazine and other means may of course be employed to reduce friction as the magazine is slid down the guideways, if desired. The rollers in the present case and the rod $a^7$ constitute a carriage upon which the magazine is removed, and for this purpose the magazine is attached to this carriage by means of hooks $a^6$ (Figs. 10 and 12), so that it can be readily removed from the rollers and rod and another magazine substituted in its place. Of course, the rollers $a^4$ may be permanently attached to the magazine, but this would be less desirable, not only on account of making it necessary to provide a set of rollers for every magazine, but as adding the weight of the rollers and their shaft, etc., to the magazine.

The guideways $e$ are provided with strips $e'$ to check the tendency of the magazine to slide toward the front of the machine as it is being removed down the guideways, and these strips $e'$ are bent up slightly at their ends to hook on to the shaft of the rollers and thus sustain the magazine as the latter reaches the limit of its movement (Fig. 10).

In order to slide the magazine upward in its plane a hand wheel $g$ is provided near the front of the machine through which a cam $g'$ may be operated to move a couple of levers $g^2$ one of which is pivoted upon each side of the machine at $g^3$ and connected by a suitable pin $g^4$ operating through a slot $g^5$ in the bracket $b$ to the magazine. The escapements or escapement pawls $h$, which may be of any preferred construction, are located above the lower end of the magazine and are suitably mounted in a pawl frame which is preferably formed of three strips $h'$, $h^2$ and $h^3$ respectively, secured together by suitable cross strips $h^4$. The pawls project through the bottom of the frame and aline with slots in the lower end of either the top or the bottom plate of the magazine; in the present case these slots being in the top plate of the magazine. In forming the slots in the magazine it is preferable to cut transverse slots $a^9$ across the end of the magazine on the exterior thereof to a sufficient depth to intersect the matrix grooves on the inner side whereby the slots will then be formed in the exact places required. It is obvious however that any other method of forming the slots may be employed. The pawl frame is provided with projections on either end thereof which engage in guideways $h^5$ in both of the brackets $b$ respectively, and these projections are preferably provided with rollers $h^6$ which ride upon the cams $h^7$ provided on each side of the machine upon a shaft $h^8$ carrying a gear $h^9$ in mesh with another gear $h^{10}$ which is operatively connected with the hand wheel. In this way when the hand wheel is turned to slide the magazine, the frame is raised and the relation of the cams is such that the frame is first raised to bring the pawls clear of the magazine before the magazine itself commences to move. The pawl frame is normally held down upon the magazine by means of springs $h^{11}$.

A suitable locking device for the matrices in the magazine is provided, and in the present case consists of a long strip $i$ arranged transversely of the magazine and normally beneath the same, and adapted to be moved into and out of the magazine to engage the shoulders upon the matrices. For this purpose the hand wheel before referred to, is provided with a gear $i'$ which meshes with a gear $i^2$ having a slotted finger $i^3$. This finger normally engages with a crank $i^4$ secured to a shaft $i^5$ provided with eccentric bearings $i^6$. Through the shaft $i^5$ the locking strip for the matrices is inserted and withdrawn to lock and unlock the matrices in the magazine at the proper times during the operation of the hand wheel, and the relation between the operating gears for the locking mechanism and the cam for moving the magazine is such that the matrices are locked in the magazine before the escapement frame rises, and before the magazine commences to move.

Abutting against the upper end of the magazine is the channel entrance $k$ from the distributer mechanism. This entrance is hung upon links $k'$ which depend from the distributer support, and a latch finger $k^2$ normally held by means of a spring $k^3$ is pivoted to the entrance casting, and holds the same normally against a roller $k^4$ provided upon the end of the magazine. As the magazine moves upwardly when the operator begins to remove the same, the parts assume successively the positions illustrated in Figs. 6, 7 and 8, as will be readily understood. Just before the parts have reached the positions shown in Fig. 8, a recess in the end of the finger $k^2$ is just above a pin or lug $k^5$ upon one of the side bars $c$. As the end of the magazine toward the operator is lowered, the spring $k^3$ snaps the finger down so that the pin $k^5$ engages in the recess therein, thus locking the entrance in its extended position where it remains until another magazine is placed upon the machine. The placing of a magazine upon the machine, as will be obvious, raises the finger again, and as the magazine slides down into position the entrance follows it, the parts returning to their original positions in the reverse order. Heretofore the entrance was either rigidly secured to the magazine or pivoted thereon, or it was pivoted to the distributer beam. In the first case it increased the weight of the magazine and interfered with its being put on and taken off, and in the latter case it interfered with the attachment and removal of the distributer mechanism. In the present case the entrance has neither of these objections, and besides this, its operation is entirely automatic, whereby it requires no thought on the part of the operator.

The attachment and removal of the magazine, it is thought will be understood completely from the foregoing. The hand wheel is so related to the operative mechanism which it controls, that the movement of the same through an eighth of the circumference completely locks the matrices in the magazine. The movement of the hand wheel through a further eighth of a circumference raises the pawl frame sufficiently to bring the pawls clear of the magazine; then the further movement of the hand wheel up to one half a revolution slides the magazine in its own plane sufficiently to disengage its projecting strips from their supporting hooks and to bring these projections upon the latches on one side and the anti-friction rollers to the guide-ways on the other side. In attaching a magazine to the machine these operations are exactly the same except that the order in which they take place is reversed.

It will be understood that various changes may be made in the construction of the parts as well as in the relation of the parts heretofore described, without departing from the invention.

I claim as my invention:

1. In a linotype machine, the combination with a magazine, of a bar on one side, means to support the magazine on that side from said bar, a guideway extending from said bar underneath the magazine upon which to remove the magazine, a bar on the other side, and a latch on the second named bar to support the magazine on said other side.

2. In a linotype machine, the combination with a magazine, of two side bars to support the magazine at an inclination, means on said side bars to sustain the magazine, a latch on one side, and means to move the magazine off from its sustaining means on one side and onto the latch.

3. In a linotype machine, the combination with a magazine, of two side bars from which the magazine is suspended, long guide-ways extending from one bar toward the other side for the magazine to travel upon, and a latch for the magazine on the other bar.

4. In a linotype machine, the combination with a magazine, of two side bars from which the magazine is suspended at an inclination, means on the bars to sustain the magazine, guideways on one bar, a latch on the other, and means to slide the magazine from its sustaining means on one bar on to the latch.

5. In a linotype machine, the combination with a magazine and means to suspend the magazine at its sides, of guideways extending from one side on which to remove the magazine, the magazine being free to swing down upon the other side.

6. In a linotype machine, the combination with a magazine, of means above the magazine to support the same at its sides, and guide-ways extending inwardly and toward one side from the supporting means on the other side, whereby the magazine may be swung down on the other side and slid upon the guide-ways.

7. In a linotype machine, the combination with a magazine having transverse strips projecting from its sides, and rollers on one side, of fixed side bars on the machine to support said magazine, members depending from said bars to receive the projecting ends of the transverse strips, guide-ways on the one side for the rollers, latches on the other side, and means to slide the magazine to free the transverse strips from the depending members of the side bars and to bring the rollers on to the guideways on one side and the projecting ends of the transverse strips on to the latches on the other side.

8. In a linotype machine, the combination of a magazine supported at an inclination, escapements, means to separate the escapements from the magazine, means to slide the magazine free of its support, and a single controller operatively connected with both of said means and through which said means are operated.

9. In a linotype machine, the combination of a magazine supported at an inclination, escapements, means to separate the escapements from the magazine, means to lock the matrices in the magazine, means to slide the magazine free of its support, a hand wheel, and operative connections between said wheel and each of said means.

10. In a linotype machine, the combination of a magazine slidable substantially in its own plane and a pivoted entrance operated automatically thereby.

11. In a linotype machine, the combination of an inclined magazine, an entrance, a link supporting the entrance from the distributer support, means to hold the entrance normally against the magazine, and a roller on the magazine coöperating with the entrance to move the same as the magazine is moved.

12. In a linotype machine, the combination of an inclined magazine, an entrance, a link supporting the entrance, and a spring finger normally holding the entrance against the magazine and operating as a latch to lock the entrance in its extended position when the magazine is removed.

This specification signed and witnessed this 17th day of January 1907.

WILLIAM HERMANN SCHARF.

Signed in the presence of—
J. JAS. FAIRBAIRN,
GEORGE D. HARTLEY.